Feb. 2, 1926.  1,571,801
W. F. ROCKWELL
DOUBLE REDUCTION BUS AXLE
Filed Oct. 4, 1924   2 Sheets-Sheet 2

Inventor
W. F. Rockwell

Patented Feb. 2, 1926.

1,571,801

UNITED STATES PATENT OFFICE.

WILLARD F. ROCKWELL, OF OSHKOSH, WISCONSIN.

DOUBLE-REDUCTION BUS AXLE.

Application filed October 4, 1924. Serial No. 741,693.

*To all whom it may concern:*

Be it known that I, WILLARD F. ROCKWELL, a citizen of the United States, and resident of Oshkosh, in the county of Winnebago and State of Wisconsin, have invented certain new and useful Improvements in Double-Reduction Bus Axles; and I do hereby declare that the following is a full, clear, and exact description thereof.

This invention relates to double reduction bus axle construction and is particularly directed to a construction eminently suited to heavy truck drives.

Objects of this invention are to provide a double reduction in which a cross shaft is employed and carries a pinion meshing with the main differential gear and is connected by means of suitable gearing with a horizontally extending drive shaft, and to arrange the axes of the drive shaft, the cross shaft and the main axle in the same horizontal plane.

Further objects are to provide a reduction mechanism which permits a low body suspension and which secures maximum road clearance, two highly desirable features in truck construction.

Further objects are to so form this mechanism that interchanging of parts may be readily effected and other drives substituted for the preferred drive if it is found desirable under unusual conditions.

An embodiment of the invention is shown in the accompanying drawings, in which.

Figure 1:
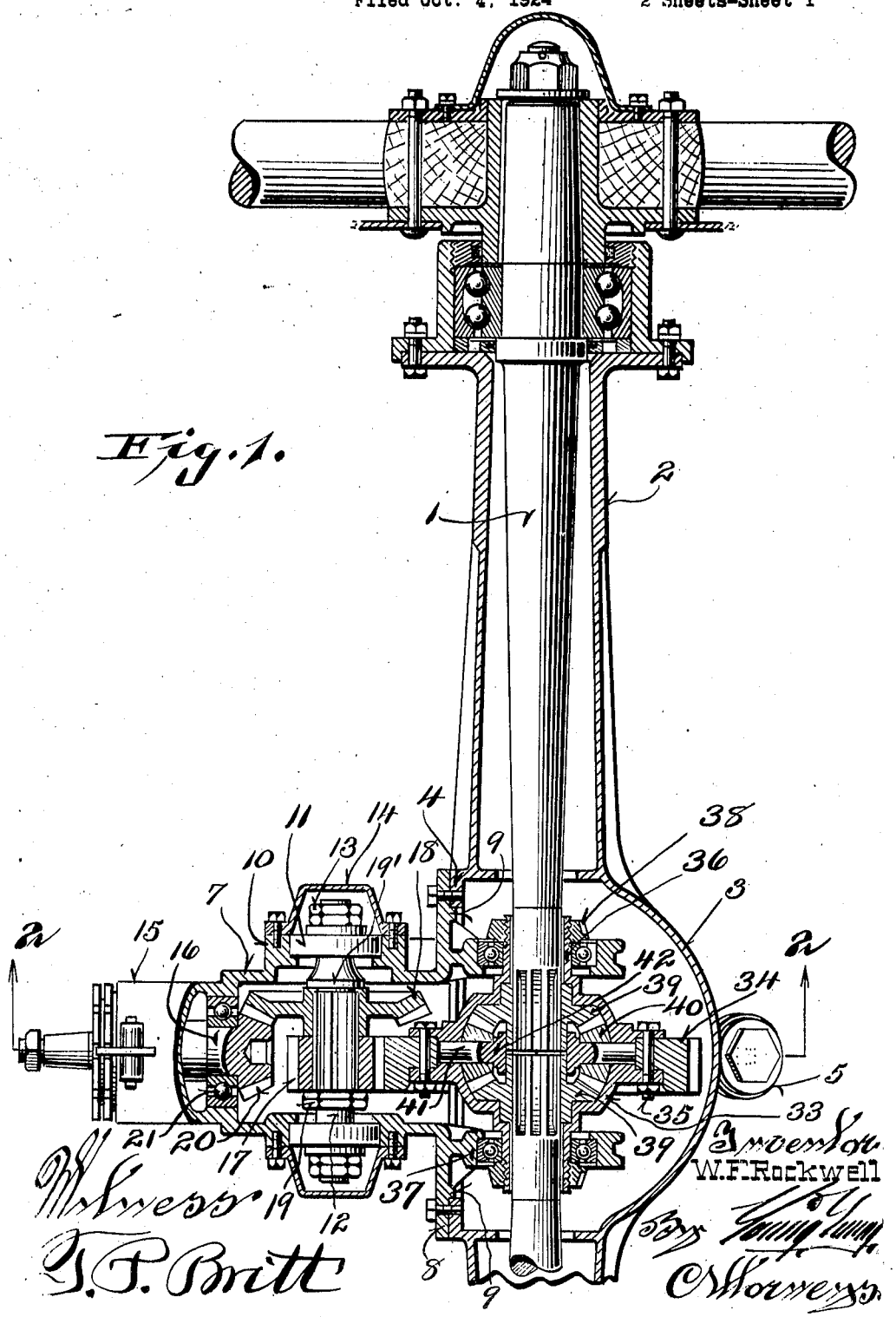
Figure 1 is a sectional view through the rear axle and the double reduction mechanism, such view being taken on the line 1—1 of Figure 2.

Referring to the drawings, it will be seen that the rear axles 1 are carried in suitable bearings at the outer end of the rear axle housing 2 and that this rear axle housing extends in unbroken continuity from one outer bearing to the other outer bearing and is provided at its central portion with an enlarged casing 3. This casing is provided with a forward flat flange 4 correctly and accurately machined to receive a further portion of the mechanism hereinafter described. The lower portion of the casing is provided with a filling fitting 5 (see Figure 2) by which means oil may be readily inserted into the casing of the mechanism. If desired, it may be provided with a drain plug 6 at its lowest point.

Referring to Figure 1 it will be seen that a removable casing indicated generally at 7 is also provided and is equipped with a closure plate 8 which is secured by means of bolts to the forward flange 4 of the casing 3. This closure plate is preferably provided with rearwardly projecting positioning flanges 9 which accurately fit correspondingly machined portions of the flanges 4, as shown in Figure 1.

This casing 7 is provided with recessed outwardly projecting bosses 10 which receive the roller bearings 11 for the cross shaft 12, such cross shaft being preferably provided with a pair of nuts 13 at each outer end which act as lock nuts and hold shaft and bearings in position.

Suitable caps 14 may be provided for housing the roller bearings 11 and the nuts 13 as well as the outer ends of the shaft. This casing 7 terminates in a forwardly projecting substantially cylindrical portion 15 which receives and houses the drive shaft 16 which, in accordance with the usual practise is connected with the propeller shaft. The cross shaft 12 is splined centrally and rigidly carries a driving pinion 17 and a driven bevel gear 18. These gears are held in place by means of nuts 19, one of which may be a lock nut, and by means of a collar 19' integral with the shaft 12.

Figure 2:
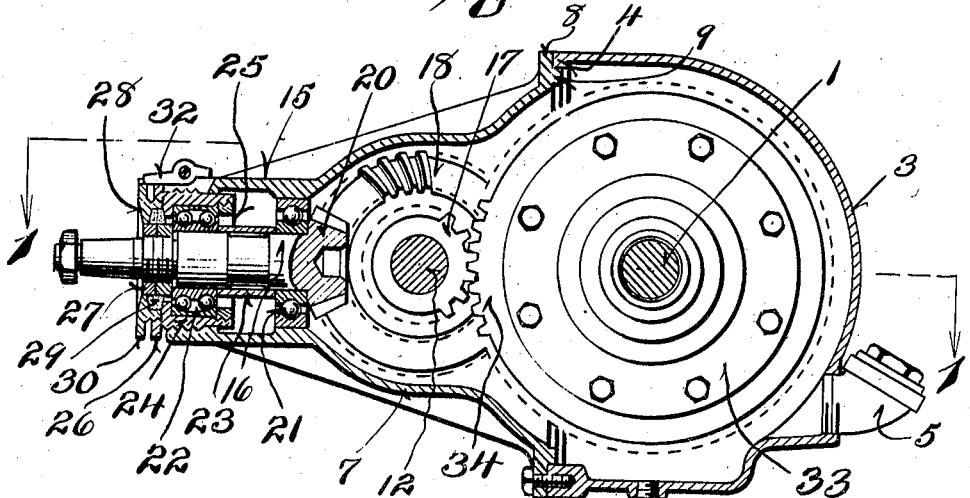
Figure 2 is a transverse vertical sectional view on the line 2—2 of Figure 1.
Figure 3:
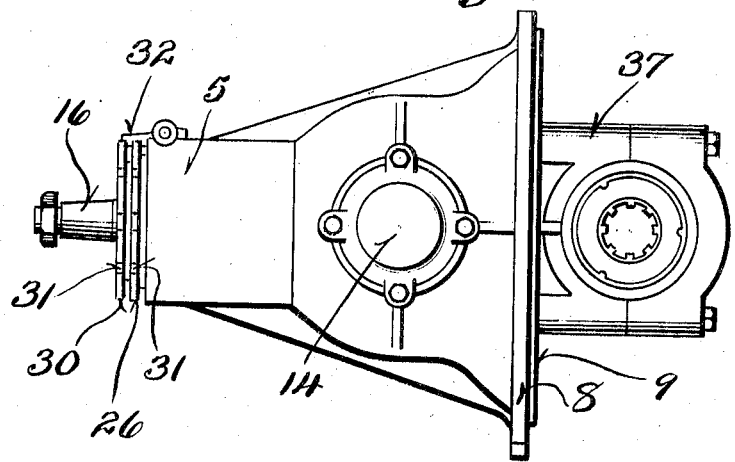
Figure 3 is a side elevation of the structure shown in Figure 2.

A bevel pinion 20 is rigidly carried by the drive shaft 16, as may be seen from Figures 1 and 2, and meshes with the gear 18 on the cross shaft.

As may be seen from Figure 2, the drive shaft 16 is carried by roller bearings 21 and 22 adjacent the front and rear ends of the cylindrical portion 15 of the casing 7. These roller bearings are so constructed as to take care of the endwise thrust as well as to carry the shaft 16. Preferably a spacing sleeve 23 is provided between the inner runways of the bearings and is co-axial with the shaft 16.

It is to be noted that while the bearing 21 is carried directly by the cylindrical portion 15 of the casing 7 that the bearing 22 is carried within a threaded sleeve or gland 24, as shown in Figure 2 and is held in position by means of an externally threaded locking ring 25, such ring forcing the outer portion of the bearing 24 against an inwardly directed flange formed on the gland 24. This gland is externally threaded and screws into the cylindrical portion 15, a suitable head 26 being provided to facilitate its manipulation. A pair of internally threaded rings 27 are screwed upon a reduced portion of the shaft 16 and one of such rings engages the inner raceway of the bearing 22, the other ring serving as a lock nut. A second gland 28 is screwed into the gland 24, and the two glands are provided with a tapered walled annular recess for the reception of packing 29 to prevent the entrance of grit or the loss of oil. This gland 28 is provided with a head 30 similar to the head 26 of the other gland.

The heads 26 and 30 are each provided with a series of notches 31 which are adapted to receive the forward end 32 of a locking lever pivoted to the cylindrical portion 15 of the casing 7. This locking lever has its major weight at its forward end, as shown, and thus remains seated in appropriate notches 31 and retains the heads 26 and 30 against rotation.

Further than this, these notches permit the use of a spanner wrench to tighten the heads as desired, it being noted, of course, that the heads may be formed polygonal for use with the usual types of wrenches if preferred.

The differential mechanism comprises a pair of shell like members 33 (see Figure 1) which carry a ring gear 34, such ring gear having a reduced portion received between suitably machined flanges integral with the shell members 33 and clamped therebetween by means of bolts 35. These shell members have outwardly projecting sleeves 36 which are received in bearing and supporting lugs 37 and suitable clamping nuts 38 are screwed upon said sleeves and engage the inner raceway of the roller bearings. The inner ends of the shafts or rear axles 1 are splined, as shown, and rigidly receive bevel gears 39, such bevel gears meshing with a series of pinions 40 in the usual manner. These pinions are carried by radial arms 41 carried by a ring 42 revolubly mounted upon inner extensions of the shell member 33. These projecting arms or pins 41 are received in regularly positioned recesses formed in the opposed portions of the shell like members 33, thus bracing the outer ends of the pins in a rigid and substantial manner.

The drive, it will be noted, is from the drive shaft 16 through the bevel pinion 20 to the bevel gear 18 through the cross shaft to the pinion 17 and from thence to the main ring gear 34 of the differential.

It is to be noted that the accurately machined substantially vertical face of the flange 4 is an accurate guide plane permitting the correct positioning of the cross shaft 12 in exact parallelism therewith.

It is to be particularly noted from reference to Figure 2 that the center lines of the rear axles 1 of the cross shaft 12 and of the drive shaft 16 all lie in the same horizontal plane passing through the centers of the rear wheels of the bus. As is apparent from the detailed description, this construction facilitates assembly in a marked degree. However, it is particularly to be noted that by this invention the straight line assembly of parts is attained and two well defined and valuable results are attained, namely, a low body suspension and maximum road clearance. These highly desirable results are attained without resorting to difficult assemblies or difficult mechanism but by providing an extremely simple assembly and co-relating the parts to provide a straight line arrangement of driving elements as clearly brought out in Figure 2.

A further feature of this straight line assembly is the ease with which all of the parts are maintained in an adequately oiled condition. None of the lubricant is required to be carried to a high point in the main casing 3 but is merely required to be elevated by the rotating parts to approximately the height of a central plane. This insures the perfect lubrication of all parts in actual practise and does not require a complete flooding of the casing 3 with oil in order to secure this adequate lubrication.

Although the invention has been described in considerable detail, it is to be understood that the invention may be variously embodied and is, therefore, to be limited only as claimed.

I claim:

1. An axle comprising a load carrying housing; a pair of axially aligned wheel driving shafts journaled in said housing; a securing and locating section formed on said housing adjacent the inner ends of said wheel driving shafts with an exterior locating surface in a plane substantially parallel to the axes of said shafts; a primary driving shaft; a gear housing in which said primary drive shaft is journalled; a locating section on said gear housing shaped to fit said first mentioned locating section and provided with an exterior locating surface substantially perpendicular to the axis of said primary driving shaft and adapted to abut against said first mentioned locating surface to locate said primary driving shaft with relation to said wheel driving shafts; a differential drive mechanism for said wheel driving shafts supported from and located by said gear housing; and reduction gearing for said differential mechanism driven by said primary driving shaft supported within said gear housing comprising an intermediate shaft interposed between said locating surfaces and said primary driving shaft.

2. The combination as set forth in claim 1 in which said primary and intermediate shafts are substantially in a plane with said wheel driving shafts.

In testimony that I claim the foregoing I have hereunto set my hand at Oshkosh, in the county of Winnebago and State of Wisconsin.

W. F. ROCKWELL.